Dec. 12, 1961   H. F. VON WIMMERSPERG   3,012,489
CAMERA
Filed April 9, 1958   3 Sheets-Sheet 2

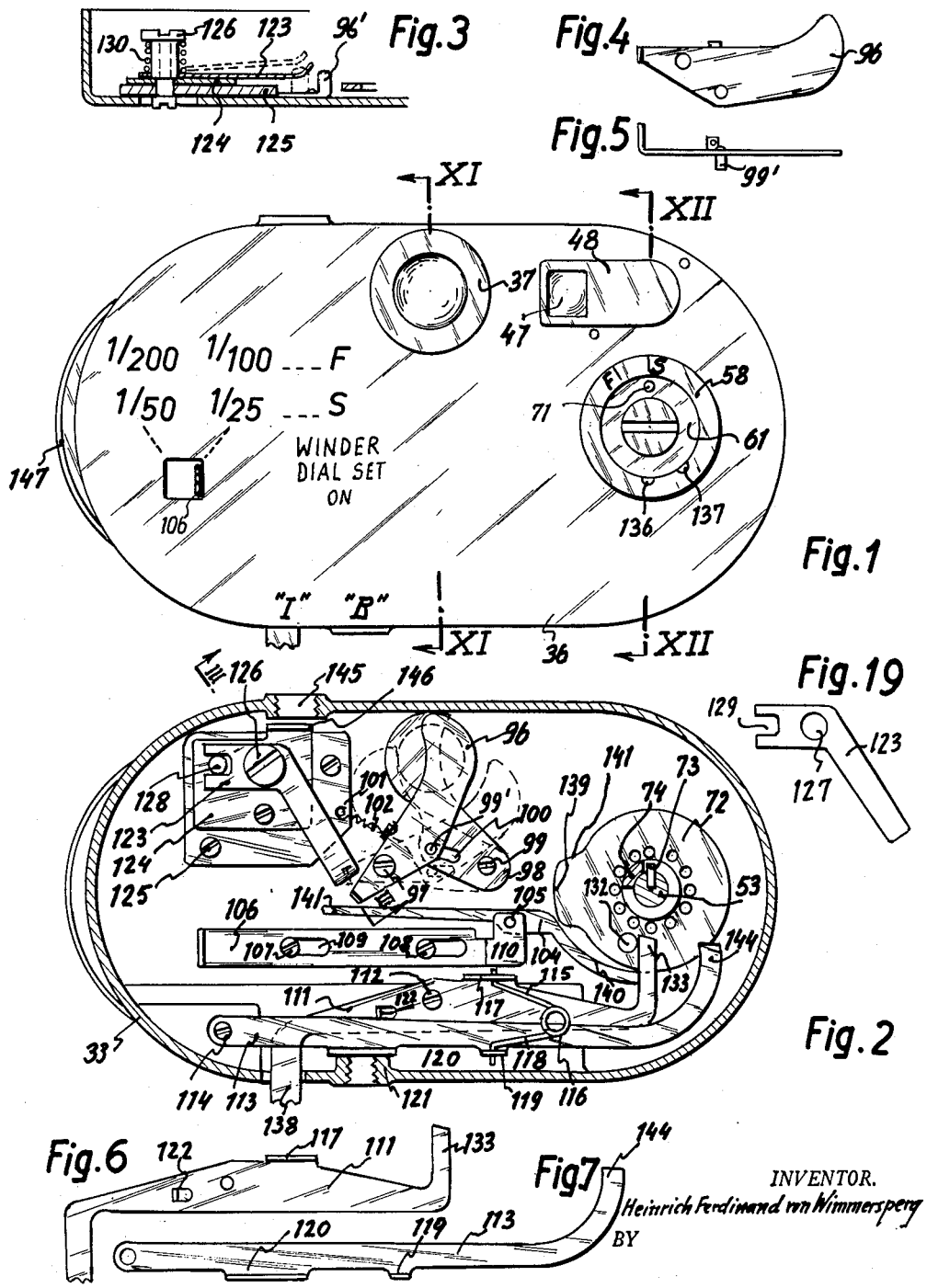

INVENTOR.
Heinrich Ferdinand von Wimmersperg
BY

Dec. 12, 1961  H. F. VON WIMMERSPERG  3,012,489
CAMERA
Filed April 9, 1958  3 Sheets-Sheet 3
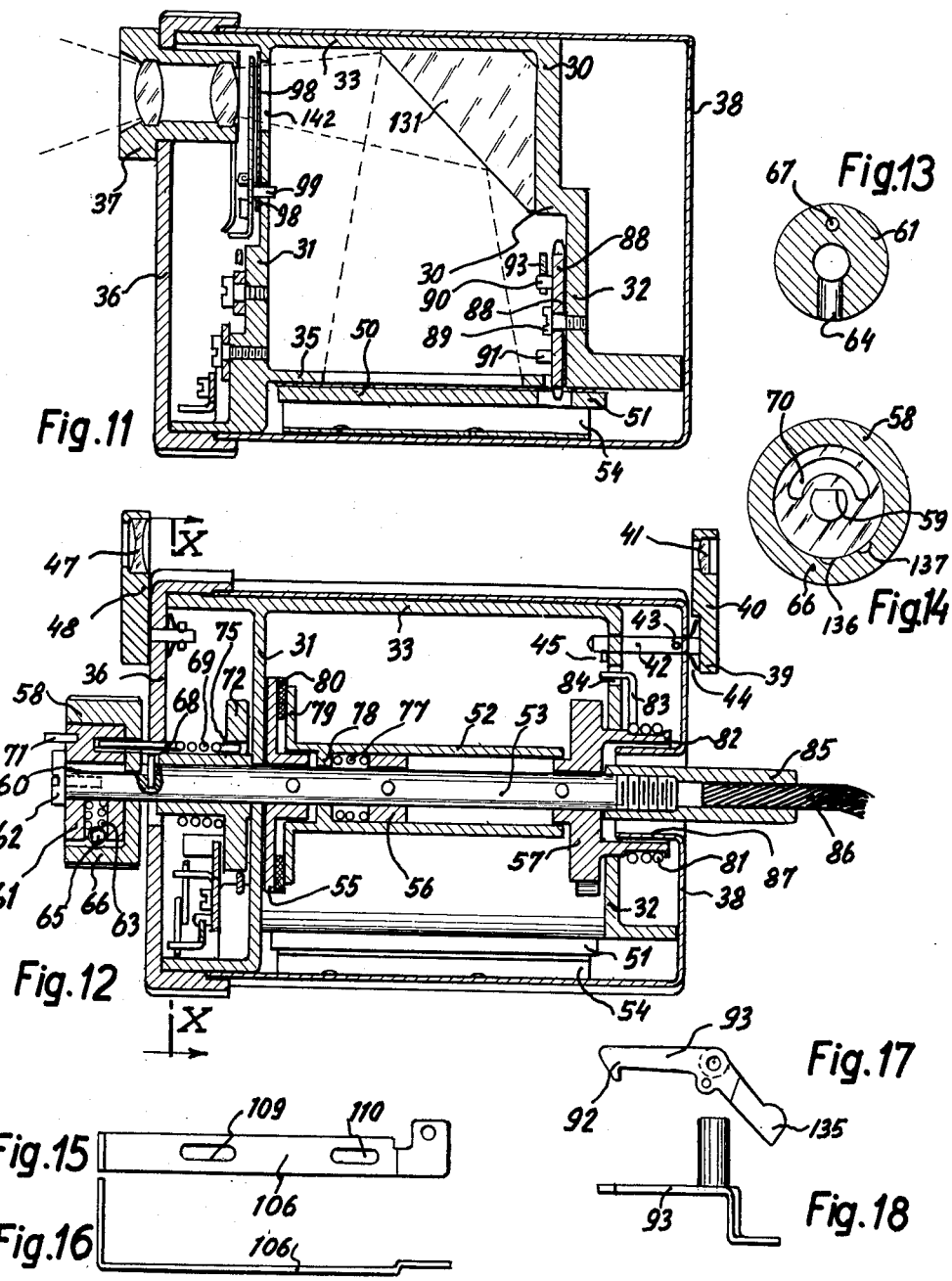
INVENTOR.
Heinrich Ferdinand von Wimmersperg
BY United States Patent Office 3,012,489
Patented Dec. 12, 1961

3,012,489
CAMERA
Heinrich Ferdinand von Wimmersperg, 15929 Grand
River Ave., Detroit 27, Mich.
Filed Apr. 9, 1958, Ser. No. 727,458
17 Claims. (Cl. 95—31)

This invention relates to photographic cameras, and pertains particularly to small, light weight cameras.

Conventional cameras are relatively bulky in relation to their image area. All efforts to reduce the size of special purpose cameras has resulted in a reduction of the image area, thus sacrificing image quality. Further, the mechanically complicated shutter mechanism of conventional cameras often fails in extreme cold temperatures, or is too noisy for special projects. The present-day types of shutters which can be set in time, bulb, and instantaneous exposure by changing the position of a lever or dial can easily be used with a wrong setting, without the photographer being aware of it. The remote control operation by electric motor or spring motor is expensive and incorporates mechanical parts which easily lead to failure. In extreme cold, the voltage of an electrical battery drops fast.

The main object of the present invention is to provide a compact, rugged, fool-proof, easy to operate camera with a relatively large image area.

Another object of this invention is to provide a camera with a shutter cocking device interlocked with the film winding mechanism.

A further object of the invention is to provide a camera with a rugged, simple shutter with adjustable shutter speed, which is not affected by low temperatures.

A further object is to provide a camera which can be operated by remote control.

A further object is to provide a camera with a synchronization for flash which does not give contact, when the shutter is being cocked.

Another object of the invention is to provide an advance mechanism for perforated film which prevents tearing of the perforation of the film during winding.

A further object is to provide a film transport which does not need to be disconnected for rewinding.

A further object is to reduce the operating noise of the shutter.

Still a further object is to provide a camera with a shutter for bulb or time exposure which can only be operated by a special, preferably detachable, release, like a cable release, thus avoiding the need of setting a dial.

A further object of the invention is to use the rotatably mounted rear element of a view finder as a lock for the camera cover.

Further objects of the invention and novel features of the construction will be apparent from the following specification when considered together with the accompanying drawings, in which:

FIG. 1 is a view in front elevation of a camera embodying the present invention, shown with the view finder collapsed.

FIG. 2 is a sectional view according to line X—X of FIG. 12 of the shutter assembly in closed position, the activator spring being eliminated for clarity.

FIG. 3 is a fragmentary sectional view along the line III—III of FIG. 2, showing the synchronization device.

FIG. 4 is a top view of the active shutter blade.

FIG. 5 is a side view of the active shutter blade.

FIG. 6 is a top view of the "instantaneous exposure" release.

FIG. 7 is a top view of the "bulb exposure" release.

FIG. 11 is a cross sectional view along line XI—XI of FIG. 1.

FIG. 12 is a sectional view along line XII—XII of FIG. 1, the film being eliminated for clarity.

FIG. 13 is a sectional view of the tension knob of the shutter perpendicular to its axis.

FIG. 14 is a sectional view of the winding knob perpendicular to its axis.

FIG. 15 is a top view of the shutter lever slide.

FIG. 16 is a side view of the shutter lever slide.

FIG. 17 is a side view of the sprocket stop.

FIG. 18 is a side view of the sprocket stop.

FIG. 19 is a top view of the synchronization contact.

Figure 8:
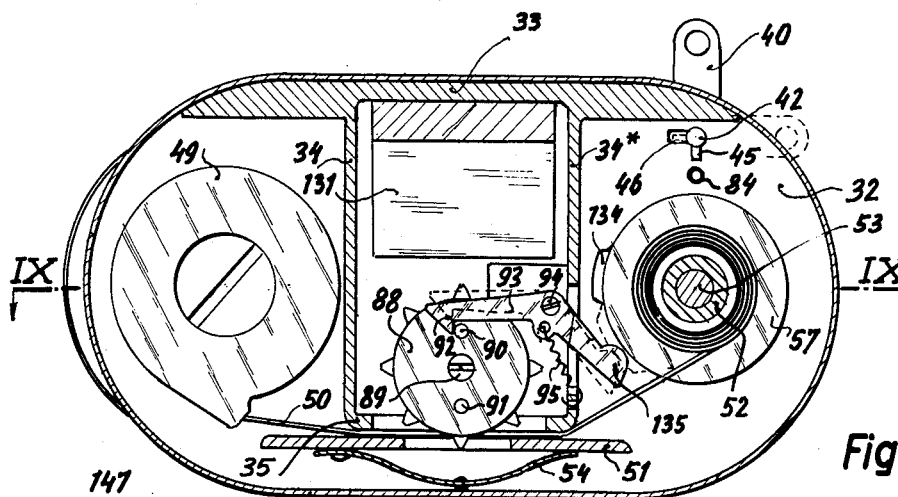
FIG. 8 is a sectional view of the film winding device, along line VIII—VIII of FIG. 9, the view finder shown erected.

The rigid camera body 30 comprises the front wall 31, the back wall 32, the top 33 (FIG. 12), the two side walls 34 (FIG. 8), and the film gate 35. The front plate 36, carrying the objective lens 37 is fastened to the front wall by screws, not shown in the drawing. The cover 38 encloses the camera body 30 and seals light tight against the front plate 36. The body 30 might be formed from several parts to facilitate production and assembly.

The lock 39 for cover 38 consists of the arm 40 with the recess and hole for the rear element 41 of the view finder, the spindle 42, the retainer pin 43, the spring washer 44, and the locking pin 45. Retainer pin and spring washer keep the lock under pressure, so that the friction is sufficient to hold the lock in the erect position, shown in FIG. 12, or in the collapsed position represented by broken lines in FIG. 8. The hole in the back wall 32 for the spindle 42 has a side slot 46 (FIG. 8) to enable the pin 45 to pass through the wall when the cover is telescoped over the camera body 30, while the arm 40 is in the position shown by broken lines in FIG. 8.

The front lens 47 of the view finder is secured in the holder 48, rotatably mounted in the front plate 36. Holder 48 and lock 39 are shown in viewing position in FIG. 12. They can be swung downwardly to reduce the size of the camera, when not in use.

Figure 10:
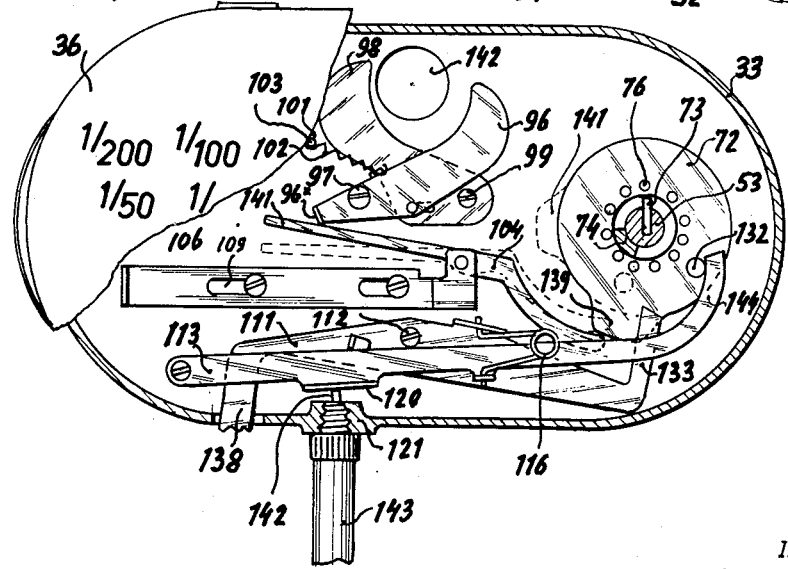
FIG. 10 is a view in front elevation and partly in section of the shutter assembly in open position of the shutter, the activator spring being eliminated, the view finder in collapsed position.

The film magazine 49 is held in place in the space at the left of the side wall 34 when viewed from the front (FIG. 8). The film 50 is guided by pressure plate 51 over the film gate 35 to the take-up spool 52 which is rotatably mounted on shaft 53. The spring 54, attached to the cover 38, forces the pressure plate 51 against the film gate 35. The shaft 53 is free to rotate in front wall 31. Pinned to the shaft 53 are the friction clutch 55, the ring 56, and the release disc 57 (FIG. 12). The winding knob 58 is mounted on the front end of the shaft. The flat 59 of its central bore coacts with the flat 60 of the shaft 53. The dial ring 61 is placed inside the winding knob 58 on shaft 53 and held in place axially by screw 62. The spring 63, located in a socket 64 (FIG. 13) of dial ring 61, presses the ball 65 toward the flange 66 of the winding knob 58. The socket 67 (FIG. 13) of the dial ring 61 accommodates the end 68 of the shutter spring 69 which protrudes through the half ring slot 70 of the winding knob 58. The pin 71 serves as handle to turn the dial ring 61 relatively to the winding knob 58. The main part of the shutter spring 69 is loosely wound over the hub of the activator 72 which is free to rotate on shaft 53 between the front wall 31 and the pin 73 on the shaft 53. The ring section 74 of the hub of the activator 72 coacts with the pin 73 (FIG. 10). The end 75 of the activator spring 69 rests in one of the holes 76. By changing the hole, the initial torsional tension (installation tension) of the spring can be adjusted. One end of the compression spring 77 rests against ring 56 pinned to shaft 53, the other end of spring 77 engaging on inside ring part 78 of the take-up spool 52, thus pressing the flange 79 of the take-up spool 52 against the friction lining 80 of the clutch 55. The release disc 57 is free to rotate in back wall 32. The spring 81 is tightly wound on the cylindrical part 82 of release disc 57. The end 83 of spring 81 protrudes into hole 84 of the back wall 32. This spring serves as a one-way stop, permitting only counterclockwise rotation of the shaft 53 (as seen from the front of the camera). The back end of the shaft 53 has a threaded part to accommodate the cable end fitting 85 of a flexible shaft 86. The cylindrical part 87 of the cover 38 fits light tight inside the cylindrical part 82 of the release disc 57.

The sprocket wheel 88 (FIG. 8) coacts with the perforations of the film as known to art and is rotatably mounted on screw 89, which is attached to back wall 32. The pins 90 and 91 are integral with the sprocket. They coact with the hook 92 of sprocket stop 93, which is pivoted on screw 94. The extension spring 95 forces the sprocket stop counterclockwise.

Figure 9:
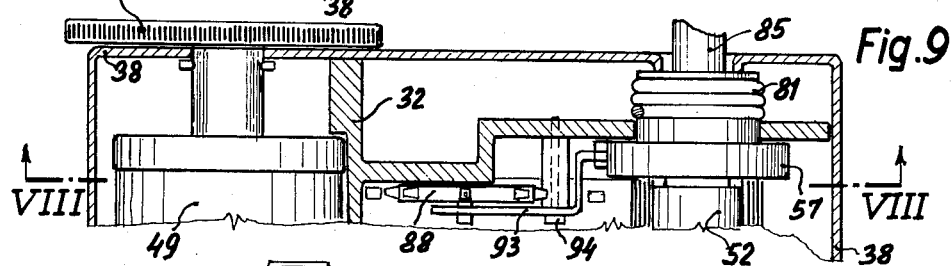
FIG. 9 is a fragmentary sectional view along line IX—IX of FIG. 8.

Referring to FIGS. 2 and 9, the shutter leaf 96 is pivoted on screw 97 and the shutter leaf 98 is pivoted on screw 99. The pin 99' of shutter leaf 96 coacts with the slot 100 of the shutter leaf 98. The end 101 of the extension spring 102 is fastened to pin 103 on the front wall 31. The other end of spring 102 is hooked to the shutter leaf 96, forcing it counterclockwise. The lever 104 is pivoted at 105 to the slide 106, which can be adjusted manually in its position with respect to activator 72, as the screws 107 and 108 coact with the slots 109 and 110 of the slide 106. The release 111 is pivoted on screw 112, mounted in front wall 31, and release 113 is pivoted on screw 114. The end 115 of spring 116 rests on ear 117 of release 111 and the end 118 on ear 119 of release 113, forcing release 111 counterclockwise and release 113 clockwise until ear 120 of release 113 rests on the cable release seat 121 of the front wall 31 and the ear 122 of release 111 rests on release 113.

The synchronization device (FIG. 2) consists of the contact 123, the contact plate 124 screwed to insulation plate 125 which is fastened to front wall 31. The shoulder nut 126 protrudes through the hole 127 (FIG. 19) of the contact 123 and the pin 128 protrudes through the slot 129. The very light spring 130 (FIG. 3) pushes the contact 123 flat onto contact plate 124.

The light entering the objective lens 37 is reflected by the aluminized front surface of the glass prism 131, which is cemented to or otherwise secured to the camera body 30, onto the film 50 resting between film gate 35 and pressure plate 57.

The film is wound on the take-up spool 52. When the winder knob 58 is turned counterclockwise after the picture is taken, the shaft 53 rotates and the pin 73 turns the ring segment 74 of the activator 72 until its pin 132 is caught by arm 133 of release 111. The clutch 55 tries to turn take-up spool 52 also and to pull the film out of the magazine 49. But the sprocket 88 resting in the perforations of the film is caught by sprocket stop 93, its hook 92 preventing rotation of pin 90 until the cam 134 of release disc 57 hits the arm 135 of the sprocket stop 93 and swings it into the dotted position (FIG. 8).

Now the film is free to be advanced. The take-up spool rotates also and pulls the film 50 out of the magazine until the pin 91 is moved into the reach of hook 92 of the sprocket stop 93, which is again in working position after the cam 134 has left arm 135 and the spring 95 has turned the sprocket stop 93 counterclockwise. The sprocket wheel 88 is thus again locked against rotation by stop 93, and with this the film is stopped again. The winding knob 58 can still be turned as the clutch 55 slips, until the pin 73 rests on ring segment 74 of activator 72 and its pin 132 is caught by arm 133. As one end of the shutter spring 69 is fastened to the winding knob 58 via the ball ratchet 63, 65 of dial 61 resting in internal grooves 136 or 137 of winding knob 58, and as the other end is fastened to activator 72, now caught by arm 133 of release 111, the spring gets tensioned. The spring 81 prevents a clockwise rotation of the shaft. The shaft rotation is blocked, the film is now wound and the shutter is cocked.

If the end 138 of the release 111 is pressed, the arm 133 frees the pin 132 and the spring 69 turns the activator 72 clockwise. Its cam 139 presses the circular shaped end 140 of lever 104 down, the end 141 moves up, and turns shutter leaf 96 clockwise. Its pin 99' coacting with slot 100 of shutter leaf 98 turns the latter counterclockwise. The shutter opening 142 of front wall 31 is open and the exposure begins. When the cam 139 leaves the end 140 of the lever 104, the spring 102 forces the shutter leaves 96 and 98 and the lever 104 to assume again their rest position. The shutter is closed again.

There are two ways of adjusting the time of an instantaneous exposure: the first is by changing the tension of spring 69 by turning the dial 61 from "S" to "F" position (FIG. 1). The ball 65, pressed into one of the grooves 136 or 137 produces a resistance against turning the dial which is greater than the maximum torque of the spring 69. It is obvious that the stronger the spring 69 is, the shorter the exposure time will be. It is further obvious that more than two positions or even a gradual setting of the shutter time over the whole range of tension adjustment can be provided.

The other way of adjusting the shutter time is by changing the position of the slide 106, thereby changing the period of time that the cam 139 contacts the circular part 140 of the lever 104. If the slide is shifted to the extreme right position (FIG. 2), the cam 139 forces the circular part 140 of lever 104 immediately down, when it starts to rotate. The shutter stays open for the longest possible time, the same spring setting being provided. If the slide is moved to its utmost left position (FIG. 10), only a much smaller part of the circular part 140 is contacted by cam 139 during exposure. The exposure time will be shorter. The most effective way to obtain long instantaneous exposure without using deceleration devices for cam 139 is to make the cam 139 as long as possible. The designer can easily adapt the shutter parts to the desired exposure time, and changes in a relatively wide range are possible without using expensive and sensitive gear trains or other delay devices.

Another advantage of this shutter is that it can be so designed that a minimum of sound is produced during operation. The cam can be so developed, that it starts movement of lever 104 free from shock. The release part 141a of the cam can be so designed that it releases the lever 104 smoothly into its rest position, thereby avoiding a hard shock to lever 104 and of shutter leaves 96 and 98 at the return movement under the influence of spring 102.

The embodiment shown in the drawings makes use of both types of changing shutter speed. As indicated on the front plate 36, the extreme right position of the slide 106 and a tension setting of "S" (see FIG. 1), shown by pin 71 facing the sign on winding knob 58, produces a shutter speed of $\frac{1}{25}$ sec. If the dial ring 61 would be on "F," a shutter speed of $\frac{1}{100}$ sec. would result. The most left position of slide 106 produces with a dial setting of "S" $\frac{1}{60}$ sec. and with "F" $\frac{1}{200}$ sec. It is obvious that the design can be simplified by using one time setting method only. This might be especially valuable where the camera has to work in extreme cold. As the number of shutter parts including springs is reduced greatly in comparison with conventional shutters and as delicate parts are avoided, the shutter is less affected by low temperatures.

If the ear 120 of release 113 is pressed upwards by the plunger 142 of a cable release 143 (FIG. 10), the hook 144 swings in the path of pin 132 before the release 111 is turned so far clockwise by pressure of release 113 on ear 122 that the activator 72 starts to rotate. Finally, the pin 132 is freed from the position shown in FIG. 2, the activator rotates and its cam 139 forces the lever 104 into the position shown by full lines in FIG. 10. The hook 144 of release 113 stops the pin 132 and the shutter is arrested in its open position until the plunger 142 is retracted. Then, the spring 116 turns the release 113 clockwise and the release 111 counterclockwise. The activator 72 continues to rotate and frees the lever 104 so that the shutter closes again.

The necessity of using a cable release for a "bulb" exposure and the fact that a special dial setting is avoided simplifies greatly the operation of the camera and makes it fool-proof, as an unintentional use of a "bulb" setting is not possible. In case of emergency, a match or a nail or any pin can be used to operate the "B" release.

After exposure, the pin 132 is out of the way of releases 111 and 113. Thus, the winding knob can now be turned again to advance the film and cock the shutter for the next picture. Double winding and double exposure are prevented.

The winding can be done also by a flexible shaft 86 from the back of the camera. The flexible shaft can be removed by turning it counterclockwise (as seen from the back).

When the shutter leaf 96 swings during exposure, its arm 96' lifts the contact 123 of the synchronization device. As the shutter is grounded, this closes the circuit of the synchronizer. The flash gun cable plug is screwed into socket 145, establishing contact with the grounded body 31 and with the insulated contact plate 124 pressing an insulated core against ear 146 of the contact plate 145 in the way known to art. The plug is not shown, not being part of the invention. The synchronizer does not make contact when the shutter is cocked during winding of the film.

For rewinding the film, rewinding knob 147 connected to the spool of the magazine in the way known to art is turned clockwise (as seen from the lens side and shown in FIG. 1). It is not necessary to disconnect the take-up spool 52 as the friction clutch 56 permits slippage. The sprocket is thereby rotated by the film and the pins 90 and 91 lift the hook 92 out of the way. No setting of levers or knob is necessary.

Although I have described my invention with a certain degree of particularity, it is understood that the present disclosure has been made only by way of example and that numerous changes in the details of construction and the combination and arrangement of parts may be resorted to without departing from the spirit and the scope of the invention as hereinafter claimed.

I claim:

1. In a camera, the combination of a manually operable film wind-up shaft, a film take-up spool rotatably mounted on said shaft, a friction clutch forming a slippable driving connection between the shaft and spool for rotating the spool when the shaft is rotated and the resistance to rotation of the spool is less than the coupling force of the clutch, a rotatable film metering device having a stop member thereon, said metering device being arranged to be rotated by engagement with the film, a latch adapted to engage the stop member and thereby prevent further rotation of the metering device when the metering device is rotated in one direction an extent to feed a predetermined length of film on the take-up spool, a cam rotatable in response to rotation of said shaft and operable to release said latch to permit winding of the film as controlled by said metering device, said clutch permitting said shaft to rotatably slip relative to the take-up spool when the latch is engaged with said stop member and means releasably locking said shaft against rotation subsequent to the engagement of said latch with said stop member.

2. The combination called for in claim 1 including means on the camera for supporting a film magazine, a film rewind shaft engageable with the spool of the film magazine for rewinding film on the spool of the magazine from said film take-up spool.

3. The combination called for in claim 2 wherein said latch is designed to bypass said stop member when the film metering device is rotated in the film rewind direction.

4. The combination called for in claim 1 wherein said wind-up shaft and said spool are coaxially arranged, said clutch comprising a pair of coaxial friction discs, one on said wind-up shaft and the other on said take-up spool, and means resiliently biasing said discs axially together.

5. The combination called for in claim 1 including a shutter and a shutter cocking device operatively connected with said wind-up shaft.

6. The combination called for in claim 5 wherein said shutter cocking device includes a shutter activator coaxial with and rotatable relative to said wind-up shaft, a cocking spring interengaging said wind-up shaft and activator and normally causing the activator to rotate with the wind-up shaft, a manually operable shutter release mechanism adapted to engage the activator and thereby prevent further rotation thereof in the wind-up direction to cause tensioning of said spring when the wind-up shaft is turned in the wind-up direction with the activator engaged by said release mechanism and means interengaging the shutter and activator for actuating the shutter when the activator is released by actuation of said release mechanism.

7. In a camera, the combination of a manually operable film wind-up shaft, a film take-up spool rotatable on said shaft, a friction disc forming a slippable driving connection between the shaft and spool for rotating the spool to wind-up film thereon when the shaft is rotated in one direction and the torque on the spool tending to resist rotation of the spool in the wind-up direction is less than the coupling force of the clutch, said shaft having a cam member rotatable therewith, a film metering sprocket engageable with the film in the camera and rotatable thereby when the film is wound on or unwound from the take-up spool, said sprocket having a stop member rotatable therewith, a latch movably mounted on the camera and biased to engage said stop to prevent further rotation of the sprocket in the film wind-up direction when a predetermined length of film has been metered by the sprocket, said cam being arranged to rotate to a position releasing said latch when the wind-up shaft is rotated in the wind-up direction after wind-up of the film is arrested by the latching of said sprocket and means releasably locking said shaft against rotation subsequent to the engagement of said latch with said stop member.

8. The combination called for in claim 7 wherein the camera includes a rewind shaft for unwinding film from the wind-up spool and rewinding it into a film magazine, said latch being arranged to bypass said stop when the sprocket is rotated in the rewind direction.

9. In a camera, the combination of a manually rotatable shaft, said shaft being free to rotate in one direction and being prevented from rotating in the opposite direction, a shutter, a shutter activator coaxial with and journalled for rotation relative to said shaft, a spring coupling the shaft and activator and normally causing the activator to rotate with the shaft, a latching device for engaging the activator to prevent rotation thereof relative to the shaft whereby when the shaft is rotated with the activator in the latched condition, said spring is wound so as to rotate the activator in said one direction when the latching device releases the activator, means on said activator for operating the shutter when the activator is released from said latched position and a release mechanism for releasing said latch device from engagement with the activator.

10. The combination called for in claim 9 wherein said activator comprises a disc and said shutter operating means comprises a cam on said disc and means operatively associated with the shutter and engaged by said cam to operate the shutter.

11. The combination called for in claim 10 wherein said last mentioned means comprises a lever which is engaged at one portion thereof by said cam.

12. The combination called for in claim 11 wherein said cam has a tapered trailing edge to minimize the shock of disengagement of the cam and lever.

13. The combination called for in claim 11 wherein said portion of the lever is curved and extends generally circumferentially around a portion of the activator.

14. The combination called for in claim 13 wherein said lever is shiftable toward and away from the activator to vary the time interval that the cam engages the curved portion of the lever.

15. The combination called for in claim 9 including means forming a lost motion driving connection between the shaft and the activator whereby when the lost motion between the activator and the shaft is taken up and the activator is in latched condition, said lost motion connection arrests rotation of the shaft.

16. The combination called for in claim 14 including a film wind-up spool having a slippable driving connection with said shaft whereby the spool is rotated to wind-up film when the shaft is rotated and the resistance to turning on the spool is less than the coupling force of said slippable driving connection between the spool and the shaft.

17. The combination called for in claim 16 including a film metering means for permitting the film to be wound on the spool in successive increments of predetermined length, latch means for controlling the operation of the film metering means and a cam rotatable with said shaft for releasing said last mentioned latch means.

References Cited in the file of this patent

UNITED STATES PATENTS

| | | |
|---|---|---|
| 1,389,164 | Roikjer | Aug. 30, 1921 |
| 1,527,476 | Gianetto | Feb. 24, 1925 |
| 1,997,130 | Weisse | Apr. 9, 1935 |
| 2,086,315 | Faas | July 6, 1937 |
| 2,364,466 | Nagel | Dec. 5, 1944 |
| 2,622,496 | Owens | Dec. 23, 1952 |
| 2,791,163 | Bammesberger et al. | May 7, 1957 |
| 2,836,109 | Mamiya | May 27, 1958 |